United States Patent [19]
Dubois, III

[11] Patent Number: 5,148,053
[45] Date of Patent: * Sep. 15, 1992

[54] SAFETY DEVICE FOR POWERED MACHINERY

[75] Inventor: Gerald N. Dubois, III, Pleasant Hill, Iowa

[73] Assignee: Townsend Engineering Company, Des Moines, Iowa

[ * ] Notice: The portion of the term of this patent subsequent to Jun. 18, 2008 has been disclaimed.

[21] Appl. No.: 659,514

[22] Filed: Feb. 21, 1991

Related U.S. Application Data

[63] Continuation of Ser. No. 419,124, Oct. 10, 1989, Pat. No. 5,025,175.

[51] Int. Cl.$^5$ .............................. F16P 3/00; B26D 7/22
[52] U.S. Cl. ................................ 307/328; 192/129 A; 83/DIG. 1
[58] Field of Search ................. 307/308, 326–328, 307/116, 38–40, 139–141.4, 119, 100; 361/1, 42, 49, 45, 212, 220, 170; 192/129 R, 129 A, 130, 132; 83/DIG. 1; 324/510; 340/649; 455/68, 70; 343/702, 718; 328/7

[56] References Cited

U.S. PATENT DOCUMENTS

| | | | |
|---|---|---|---|
| 3,953,770 | 4/1976 | Hayashi | 307/116 X |
| 4,075,961 | 2/1978 | Harris | 112/277 |
| 4,722,021 | 1/1988 | Hornung et al. | 361/49 |
| 4,794,273 | 12/1988 | McCullough et al. | 307/139 |
| 4,814,632 | 3/1989 | Glaeser et al. | 307/116 |

FOREIGN PATENT DOCUMENTS 3501021 1/1985 Fed. Rep. of Germany .

*Primary Examiner*—Howard L. Williams
*Assistant Examiner*—David Osborn
*Attorney, Agent, or Firm*—Zarley, McKee, Thomte, Voorhees & Sease

[57] ABSTRACT

This invention provides a safety device for powered machinery comprising a conventional wire mesh safety glove adapted for wearing by the machine operator. The machine with which it is used has a grounded frame, an electrical motor, a control switch, with the electrical motor being connected to a source of electrical energy through the control switch. A control safety circuit connects the electro conducting wire mesh safety glove and by-passes the conventional control switch for the machine which is in turn connected to the motor of the machine. The safety circuit includes a circuit breaking means, preferably a relay, whereby the relay will open and deprive the motor from electrical power whenever the wire mesh glove comes in contact with the grounded frame of the machine. An alternate form of the invention connects the wire mesh glove of the operator to the antenna of a radio transmitter worn by the operator. The circuit breaking means includes a radio receiver means which remains closed when receiving a radio signal, but which will open when the antenna of the radio transmitter is grounded to the frame through the wire mesh glove touching the frame which serves to interrupt the transmission of the radio signal. This causes the electrical power to the motor to be interrupted.

2 Claims, 2 Drawing Sheets

SAFETY DEVICE FOR POWERED MACHINERY

This is a continuation of application Ser. No. 07/419,124 filed on Oct. 10, 1989, now U.S. Pat. No. 1,025,175 issued June 18, 1990.

BACKGROUND OF THE INVENTION

Meat skinning machines with sharp skinning knives, and gripping rolls, can cause severe injury to an operator whose hands come in contact with the knives of these machines.

Therefore, a principal object of this invention is to provide a safety means for powered machinery which will automatically deprive the machine of power when the operator even touches the machine in even a non-emergency situation.

A further object of this invention is to provide a safety means for powered machinery wherein the operator does not need to actuate a separate emergency switch to cut power to the machine.

A still further object of this invention is to provide a safety means for powered machinery that is fully automatic.

These and other objects will be apparent to those skilled in the art.

SUMMARY OF THE INVENTION

This invention provides a safety means for powered machinery comprising a conventional wire mesh safety glove adapted for wearing by the machine operator. The machine with which it is used has a grounded frame, an electrical motor, a control switch, with the electrical motor being connected to a source of electrical energy through the control switch.

A control safety circuit connects the electro conducting wire mesh safety glove and by-passes the conventional control switch for the machine which is in turn connected to the motor of the machine. The safety circuit includes a circuit breaking means, preferably a relay, whereby the relay will open and deprive the motor from electrical power whenever the wire mesh glove comes in contact with the grounded frame of the machine.

An alternate form of the invention connects the wire mesh glove of the operator to the antenna of a radio transmitter worn by the operator. The circuit breaking means includes a radio receiver means which remains closed when receiving a radio signal, but which will open when the antenna of the radio transmitter is grounded to the frame through the wire mesh glove touching the frame which serves to interrupt the transmission of the radio signal. This causes the electrical power to the motor to be interrupted.

DESCRIPTION OF THE PREFERRED EMBODIMENT

Figure 1:
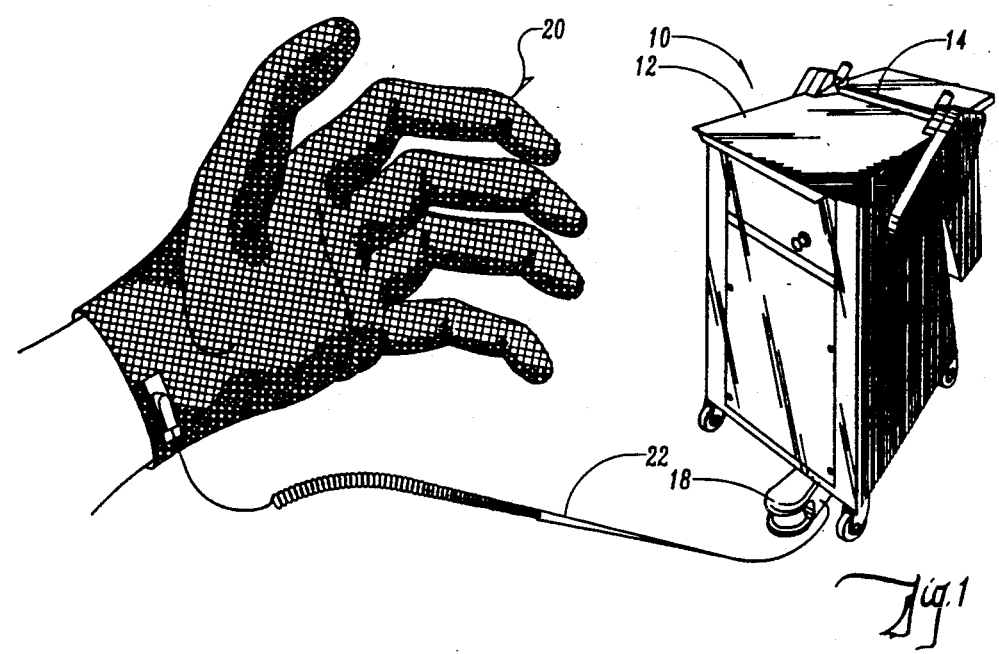
FIG. 1 is a schematic perspective view of the device of this invention connected to a meat skinning machine.

The numeral 10 designates a conventional meat skinning machine having a frame 12, an elongated sharp cutting knife 14, an electrical motor 16 (FIG. 4) and a conventional foot switch 18. The motor 16 operates a gripping roll 12A which functions in conjunction with cutting knife 14 to sever the skin from a portion of meat. The motor 16 is connected to a source of electrical energy (not shown) through foot switch 18. The skinning machine 10, as described, is conventional in the art and does not of itself comprise the instant invention.

The numeral 20 designates a conventional wire mesh glove which is worn in packing plants by various operators to protect the hands from knives and other sharp instruments used in the meat processing operations. Glove 20 in FIG. 1 is connected by lead 22 to a control safety circuit 24. Safety circuit 24 is embodied in the machine 10 and is comprised of conventional components including transistor 26, logic gates 28 and 30, and timer 32. A normally closed relay 34 is connected to a source of electrical energy through transistor 26, and to motor 16 by leads 36 and 38. Leads 39 and 39A extend towards switch 18 and a source of electrical power. Ground wire 40 connects frame 12 to a suitable electrical ground.

Figure 2:
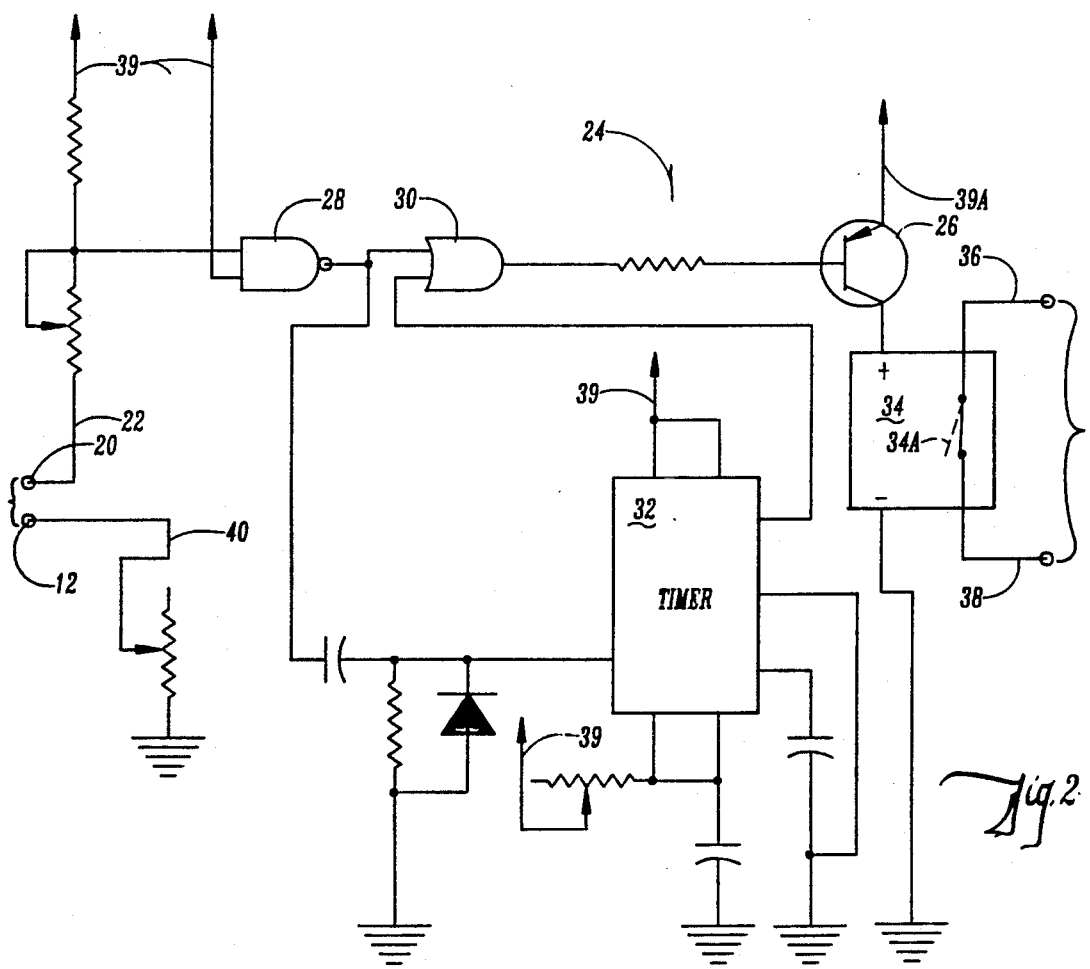
FIG. 2 is a schematic wiring diagram of the safety circuit of the device of FIG. 1.

In operation, the operator closes foot switch 18 which causes electrical energy to pass towards closed relay 34 through lead 39A to motor 16. However, as shown in FIG. 2, when the lead 22 is connected to the ground wire 40 by reason of the glove 20 engaging the grounded frame 10, gates 28 and 30 are turned on. The input power from lead 39A is thereupon blocked, whereupon the relay 34 is opened, (see dotted line 34A in FIG. 2) thus denying electrical power to the motor 16. Timer 32 serves to maintain the polarity of transistor 26 to keep relay 34 open for a preset period of 1-10 seconds so that motor 16 will not instantly restart when the grounding of the machine is broken by removing contact of glove 20 with frame 12.

As a result, the skinning machine 10 will be stopped whenever the glove 20 comes into engagement with the machine. The machine will be stopped even when an emergency situation does not exist. Obviously, power to the machine will be stopped upon any contact between the glove and the machine regardless of whether the glove touches the machine in a dangerous area or in any other area.

Figure 3:
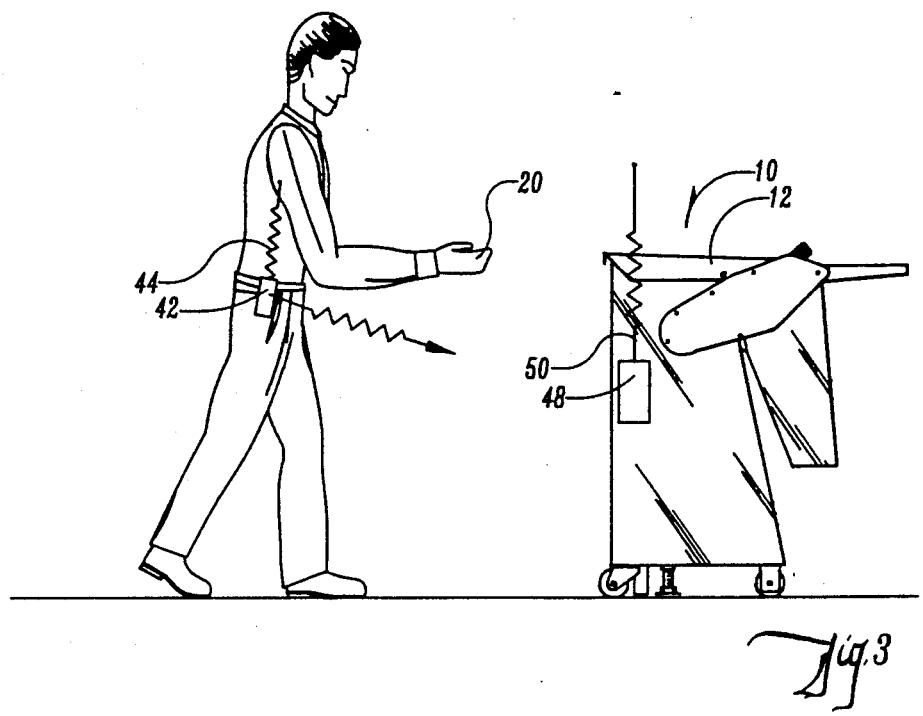
FIG. 3 is a schematic view of an alternate form of the invention wherein the operator is wearing a radio transmitter which functions in conjunction with a radio receiver on a meat skinning machine.
Figure 4:
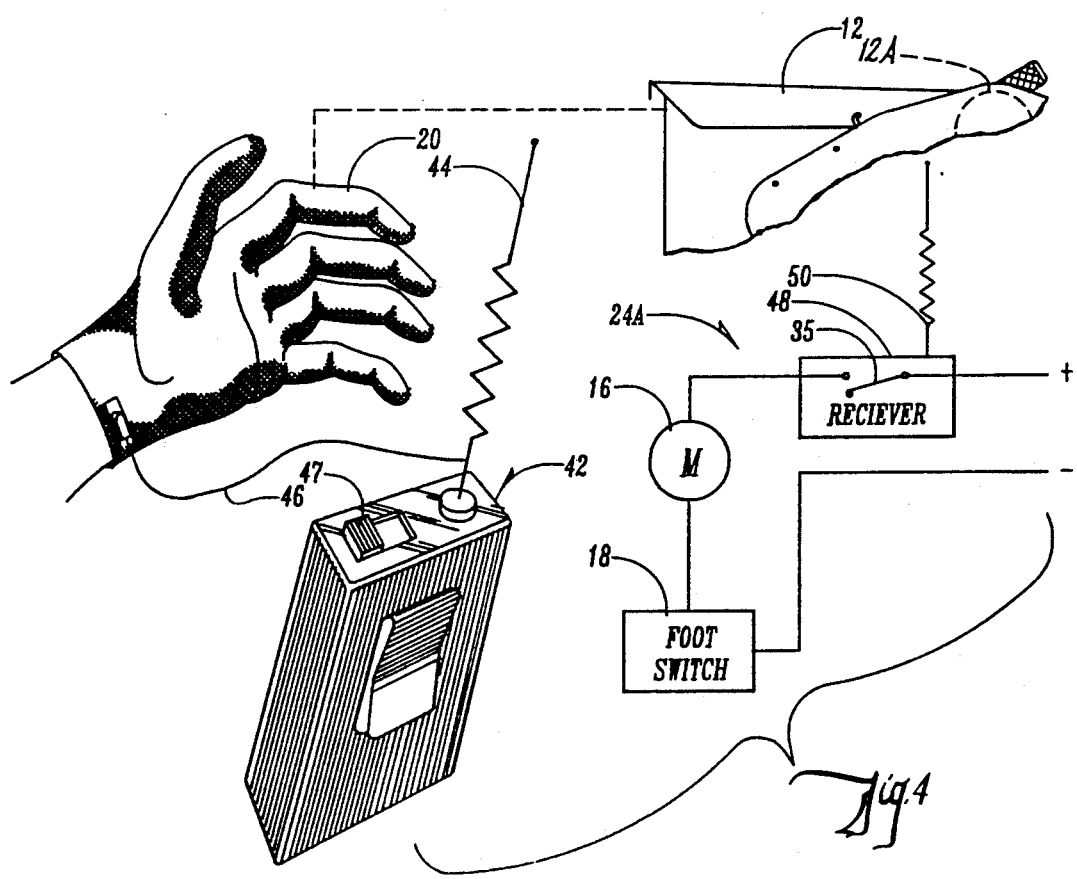
FIG. 4 is a schematic view of the safety circiut of the device of FIG. 3.

An alternate form of the invention is shown in FIGS. 3 and 4. A control safety circuit 24A is shown in FIG. 4 and includes a radio transmitter 42 which is preferably battery operated and which is carried on the person of the operator Transmitter 42 includes an antenna 44 which is grounded to glove 20 by lead 46. Transmitter 42 has a conventional on and off switch 47.

Control safety circuit 24A includes a radio receiver 48 comprising a relay 35 similar to the previously described relay 34. Relay 35 is imposed between the source of electrical energy (not shown) and motor 16 and foot switch 18. Radio receiver 48 includes a conventional antenna 50.

In operation, the operator will turn the switch 47 of transmitter 42 to an on position which causes a radio signal to be sent from antenna 44 on the transmitter 42 to the antenna 50 on receiver 48. This will cause relay 35 to move to the closed position so that when foot switch 18 is closed, electrical power will be delivered to motor 16.

However, whenever the glove 20 touches the grounded frame 12 of machine 10, the antenna 44 will be grounded, thus interrupting the transmission of the radio signal from antenna 44 to antenna 50. This in turn will cause relay 35 to open, whereupon electrical energy to motor 16 will be immediately interrupted.

Thus, from the foregoing, it is seen that this invention will achieve at least all of it's stated objectives.

I claim:

1. A safety means for a meat skinning machine comprising a rotationally powered gripping roll means which functions in conjunction with a cutting knife to sever the skin from a portion of meat, comprising, a safety glove adapted for wearing by a machine operator, said glove having an electroconducting surface, an electrically powered skinning machine having a frame, a rotationally powered gripping roll means on said frame, a radio signal receiver actuated control means on said meat skinning machine to control the rotation of said gripping roll by allowing rotation thereof during reception of a radio signal, and stopping rotation thereof when said radio signal is interrupted, a radio signal transmitter means connected to said electroconducting surface of said glove so that when said electroconducting surface is grounded to said skinning machine, any radio signal emitted by said transmitter means will be interrupted and said control means will stop rotation of said gripping roll.

2. A method of stopping the rotation of a gripping roll on a meat skinning machine, comprising, placing a radio receiver actuated control means on said meat skinning machine to control the rotation of said gripping roll by allowing rotation thereof during the reception of a radio signal, and stopping rotation thereof when said radio signal is interrupted, placing safety gloves having electroconducting surfaces on the hands of a machine operator, providing a radio signal transmitter means on the person on said operator, connecting said transmitter means to said electroconducting surfaces on said gloves so that when said electroconducting surfaces are grounded to said skinning machine, an radio signal emitted by said transmitter means will be interrupted, emitting a radio signal from said transmitter means for reception by said control means, and interrupting said radio signal by grounding at least one of said electroconducting surfaces of said safety gloves to said meat skinning machine to stop the rotation of said gripping roll.

* * * * *